(12) United States Patent
Hayashi

(10) Patent No.: US 9,110,283 B2
(45) Date of Patent: Aug. 18, 2015

(54) SUPER-RESOLUTION OBSERVATION APPARATUS THAT CHANGES PROCESS CONTENTS ACCORDING TO INTENSITY LEVEL OF NOISE IN DIGITAL IMAGE DATA

(71) Applicant: Olympus Corporation, Tokyo (JP)

(72) Inventor: Shinichi Hayashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 291 days.

(21) Appl. No.: 13/625,170

(22) Filed: Sep. 24, 2012

(65) Prior Publication Data

US 2013/0083186 A1    Apr. 4, 2013

(30) Foreign Application Priority Data

Sep. 30, 2011    (JP) ................................. 2011-216945

(51) Int. Cl.
*H04N 7/18*    (2006.01)
*G02B 21/00*    (2006.01)
(Continued)

(52) U.S. Cl.
CPC ........ *G02B 21/0036* (2013.01); *G02B 21/0076* (2013.01); *G02B 21/16* (2013.01); *G02B 27/58* (2013.01)

(58) Field of Classification Search
None
See application file for complete search history.

(56) References Cited

U.S. PATENT DOCUMENTS 4,653,909 A * 3/1987 Kuperman ................. 356/124.5
5,625,613 A    4/1997 Kato et al.
(Continued)

FOREIGN PATENT DOCUMENTS

JP    07-234382 A    9/1995
JP    08-122648 A    5/1996
(Continued)

OTHER PUBLICATIONS

Mee, Modulation Transfer Function Compensation through a modified Wiener Filter for spatial image quality improvement, Oct. 2010, 10th WSEAS/IASME International Conference on Electric Power Systems, High Voltages, Electric Machiens (POWER 2010). 6th WSEAS International Conference on Remote Sensing (REMOTE 2010), pp. 177-182.*

(Continued)

*Primary Examiner* — Jay Patel
*Assistant Examiner* — Francis G Geroleo
(74) *Attorney, Agent, or Firm* — Holtz, Holtz, Goodman & Chick PC

(57) ABSTRACT

Super-resolution observation apparatus includes excitation light irradiation unit for irradiating excitation light intended to excite a sample on the sample, excitation light modulation unit for modulating a spatial intensity distribution of the excitation light on the sample, enlarged image forming unit for forming an enlarged image of the sample at an image position from observation light generated by irradiating the excitation light on the sample, image capturing unit for converting a spatial intensity distribution of the enlarged image into digital image data, and super-resolution processing unit for generating a super-resolution image where a super-resolution frequency component higher than a cutoff frequency of the enlarged image forming unit is made visible from one or a plurality of pieces of the digital image data. The super-resolution processing unit includes spatial frequency intensity modulation unit that change process contents according to an intensity level of a noise included in the digital image data.

15 Claims, 18 Drawing Sheets

(51) Int. Cl.
   *G02B 21/16*   (2006.01)
   *G02B 27/58*   (2006.01)

(56) References Cited

U.S. PATENT DOCUMENTS

| | | | |
|---|---|---|---|
| 8,040,604 B2 * | 10/2011 | Zalevsky et al. | 359/558 |
| 8,570,655 B2 * | 10/2013 | Ben-Eliezer et al. | 359/559 |
| 8,670,040 B2 * | 3/2014 | Nokita | 348/222.1 |
| 8,823,822 B1 * | 9/2014 | Bhakta et al. | 348/222.1 |
| 2008/0122428 A1 * | 5/2008 | Kuhn et al. | 324/96 |
| 2009/0084959 A1 * | 4/2009 | Hudgings et al. | 250/341.8 |
| 2009/0268280 A1 * | 10/2009 | Osawa et al. | 359/363 |
| 2010/0053735 A1 * | 3/2010 | Wilson et al. | 359/363 |
| 2010/0141750 A1 | 6/2010 | Osawa et al. | |
| 2010/0157422 A1 | 6/2010 | Ouchi et al. | |
| 2011/0205402 A1 * | 8/2011 | Kumar et al. | 348/240.3 |
| 2011/0267688 A1 * | 11/2011 | Kleppe et al. | 359/385 |
| 2011/0304723 A1 * | 12/2011 | Betzig | 348/79 |
| 2014/0232907 A1 * | 8/2014 | Endo | 348/240.1 |

FOREIGN PATENT DOCUMENTS

| | | |
|---|---|---|
| JP | 2006-221190 A | 8/2006 |
| JP | 2008-090071 A | 4/2008 |
| JP | 2009-300589 A | 12/2009 |
| WO | WO2006/109448 A1 | 10/2006 |
| WO | WO 2009/031418 A1 | 3/2009 |

OTHER PUBLICATIONS

Japanese Office Action dated Oct. 22, 2013 in counterpart Japanese Application No. 2011-216945.

M. Gustafsson et al; Three-Dimensional Resolution Doubling Inn Wide-Field Fluorescence Microscopy by Structured Illumination; 2008; Biophysical Journal, vol. 94, pp. 4957-4970.

Japanese Office Action dated Mar. 18, 2014 (and English translation thereof) in counterpart Japanese Application No. 2011-216945.

* cited by examiner

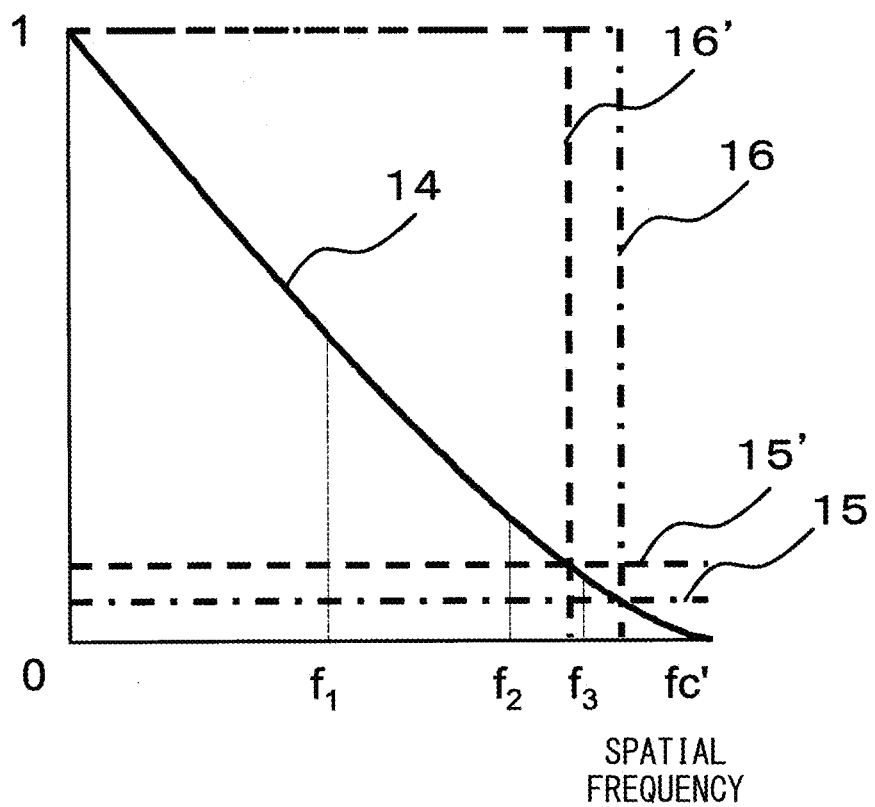
F I G. 4A

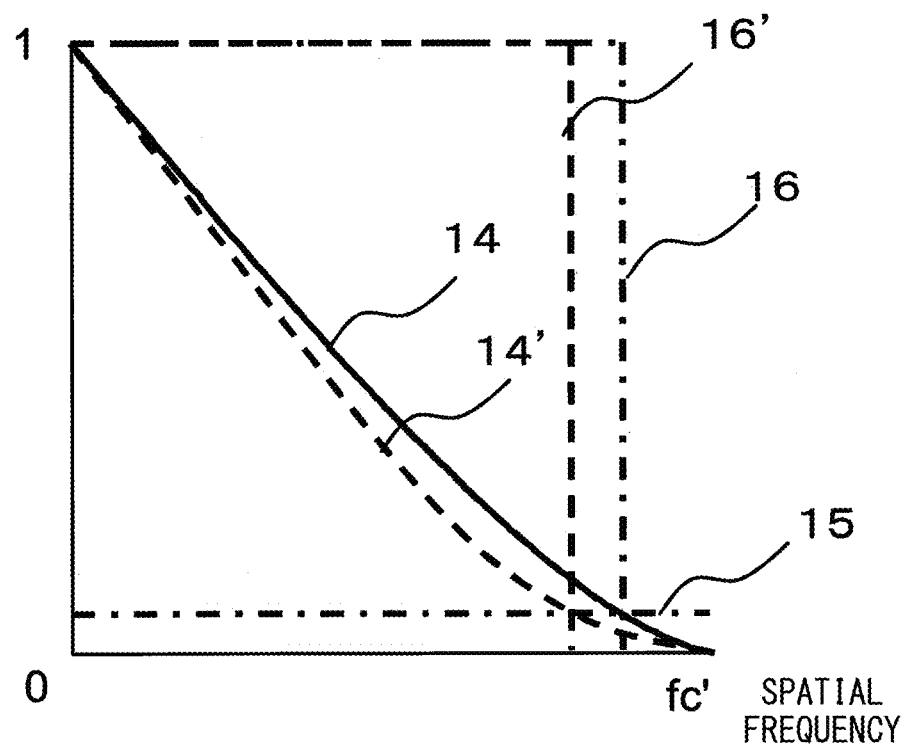
F I G. 6

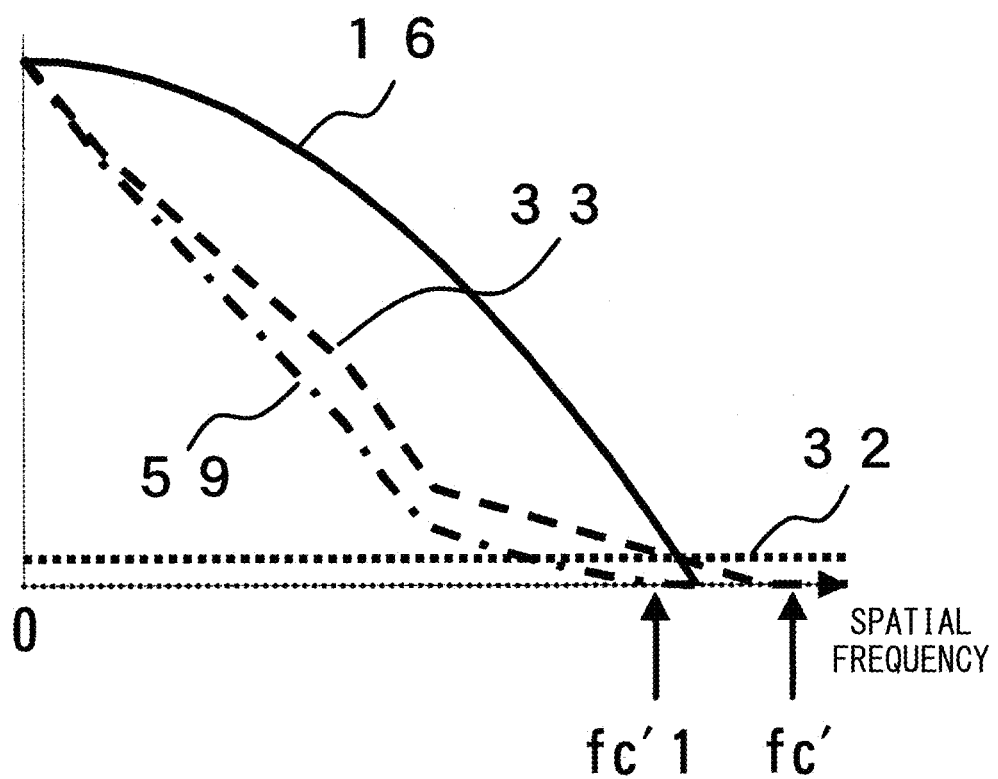
F I G. 7C

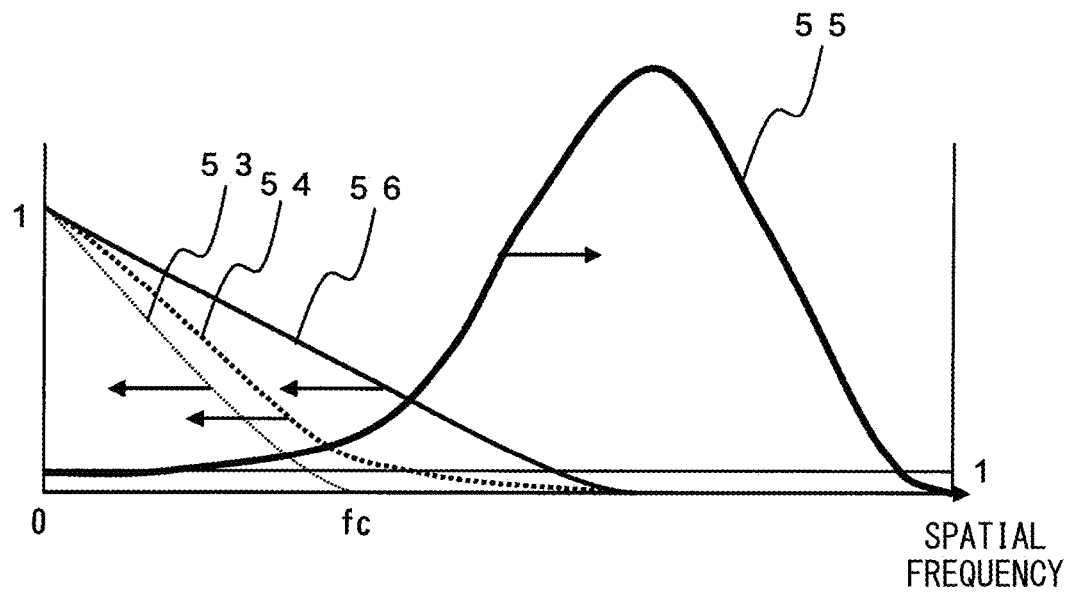
F I G. 11

SUPER-RESOLUTION OBSERVATION APPARATUS THAT CHANGES PROCESS CONTENTS ACCORDING TO INTENSITY LEVEL OF NOISE IN DIGITAL IMAGE DATA

CROSS-REFERENCE TO RELATED APPLICATIONS

This application is based upon and claims the benefit of priority from prior Japanese Patent Application No. 2011-216945, filed on Sep. 30, 2011, the entire contents of which are incorporated herein by this reference.

BACKGROUND OF THE INVENTION

1. Field of the Invention

The present invention relates to a super-resolution observation apparatus that can obtain a sample image having a super-resolution exceeding a resolution limit of an image forming optical system.

2. Description of the Related Art

In recent years, techniques of obtaining a sample image having a resolution exceeding a resolution limit of an image forming optical system (hereinafter referred to as a super-resolution) have been developed and put into practical use. For example, a microscopy called SIM (Structured Illumination Microscopy) is known as one of such super-resolution techniques. SIM is disclosed, for example, by International Publication Pamphlet No. 2006/109448, and M. Gustafsson, et. al., Biophysical Journal, Vol. 94, pp. 4957-4970.

In a microscopic observation, illumination light is irradiated on a sample as uniformly as possible with a general wide-field observation method. With SIM, however, illumination light is modulated, and illumination light with fringes is mainly irradiated on a sample. As a result, a spatial frequency of an observation light intensity distribution contributing to image forming can be shifted. By restoring the shifted spatial frequency to the original state after the illumination light passes through the image forming optical system, a sample image having a super-resolution exceeding a resolution limit of the image forming optical system can be generated.

FIG. 1 illustrates a basic configuration of a conventional super-resolution observation apparatus. FIG. 2A illustrates an observation light intensity spatial frequency characteristic on a sample S. FIG. 2B illustrates an observation light intensity spatial frequency characteristic at an image position I. FIG. 2C illustrates a spatial frequency characteristic of a super-resolution image for which a super-resolution process has been executed. A basic configuration and operations of the conventional super-resolution observation apparatus are described with reference to these figures.

The super-resolution observation apparatus (1) illustrated in FIG. 1 is configured by including: an excitation light irradiation unit (2) for irradiating, on a sample S, excitation light intended to excite a label included in the sample S and to emit observation light; an excitation light modulation unit (3) for modulating a spatial intensity distribution of the excitation light on the sample S; an enlarged image forming unit (4) for forming an enlarged image of the sample S at the image position I from the observation light generated by irradiating the excitation light on the sample S; an image capturing unit (5) for converting a spatial intensity distribution of the enlarged image into digital image data; and a super-resolution processing unit (6) for generating a super-resolution image having a super-resolution frequency component exceeding a cutoff frequency of the enlarged image forming unit (4) from one or a plurality of pieces of the digital image data.

The excitation light irradiating unit (2) can irradiate, on the sample S, excitation light having a wavelength band that can excite the sample S, and a sufficient intensity. A label for locally generating observation light having an intensity almost proportional to the intensity of the excitation light is distributed on the sample S, and observation light having a spatial intensity distribution that correlates with a product of the spatial intensity distribution of the excitation light on the sample S and a spatial concentration distribution of the label is generated from the sample S. If the intensity of the excitation light on the sample S is uniform as typified by a wide-field observation method, the spatial intensity distribution of the observation light on the sample S is similar to the spatial concentration distribution of the label. Also an observation light intensity spatial frequency characteristic (7) obtained by performing a Fourier transform on the spatial intensity distribution of the observation light is equal to a label concentration spatial frequency characteristic (8) obtained by performing a Fourier transform on the spatial concentration distribution of the label. In contrast, if the intensity of the excitation light on the sample S is not uniform, the spatial intensity distribution of the observation light on the sample S is different from the spatial concentration distribution of the label. As illustrated in FIG. 2A, some shift components (9) obtained by shifting the label concentration spatial frequency characteristic (8) by a shift amount fs in a frequency space are added to the observation light intensity spatial frequency characteristic (7) with a certain linear combination coefficient.

The excitation light modulation unit (3) is arranged between the excitation light irradiation unit (2) and the sample S, or included in the excitation light irradiation unit (2). The excitation light modulation unit (3) can change the spatial intensity distribution of the excitation light on the sample with time. Accordingly, the linear combination coefficient of the shift components (9) of the label concentration spatial frequency characteristic (8), which are included in the observation light intensity spatial frequency characteristic (7), can be changed.

The enlarged image forming unit (4) projects the spatial intensity distribution of the observation light on the sample S at the image position I. The enlarged image forming unit (4) has a unique cutoff frequency fc, and cannot project a portion of spatial frequencies having an absolute value that is higher than fc in the observation light intensity spatial frequency characteristic (7) on the sample S at the image position I. This means that the observation light intensity spatial frequency characteristic (7') at the image position I includes only a portion of spatial frequencies having an absolute value that is lower than fc in the observation light intensity spatial frequency characteristic (7) on the sample S as illustrated in FIG. 2B. Accordingly, fc determines a resolution limit of the enlarged image forming unit itself.

The image capturing unit (5) converts the spatial intensity distribution of the observation light at the image position I into digital image data composed of brightness values. The brightness values included in the digital image data are associated with coordinates of the image position I, and have a value almost proportional to an intensity of the observation light at each coordinate position. If the spatial intensity distribution of the excitation light on the sample S is uniform, this digital image data results in an image composed of a portion of spatial frequencies having an absolute value that is lower than fc in the label concentration spatial frequency characteristic (8). This image is called a wide-field image. A cutoff frequency of the wide-field image is fc that is the same as the cutoff frequency of the enlarged image forming unit (4). In contrast, if the spatial intensity distribution of the excitation light on the sample S is not uniform, the digital image data includes also portions of spatial frequencies having an absolute value that is lower than fc in the shift components (9) of the label concentration spatial frequency characteristic (8) as illustrated in FIG. 2B.

The super-resolution processing unit (6) generates a super-resolution image composed of components including up to spatial frequencies fc+fs having an absolute value that is higher than fc in the label concentration spatial frequency characteristic (8) by restoring the shift components (9) of the label concentration spatial frequency characteristic (8), which are included in the digital image data generated by the image capturing unit (5), to the original frequencies by the shift amount fs as illustrated in FIG. 2C.

Influences that a noise component included in digital image data exerts on a super-resolution image are described next with reference to FIGS. 3A, 3B and 3C. FIG. 3A illustrates an example of a transfer function (MTF) (10) for the label concentration spatial frequency characteristic of the sample S in a spatial frequency space of a super-resolution image, and a spatial frequency characteristic (11) of the noise component. FIG. 3B illustrates an example of image forming patterns (12) of respective spatial frequency components f1, f2 and f3 in a case where no noise component is present. FIG. 3C illustrates an example of image forming patterns (12') of the respective spatial frequency components in a case where a noise component (13') is present.

For a transfer of the spatial frequency components from the sample S to the super-resolution image in the super-resolution observation apparatus (1), an image forming contrast of the spatial frequency components is described by the transfer function (MTF) (10). Generally, an image forming contrast of the MTF (10) becomes lower as a spatial frequency increases, and the MTF (10) exceeding the cutoff frequency fc' of the super-resolution image reduces to 0.

Image forming patterns (12) of the spatial frequency components in a case where no noise component is present are initially described. An amplitude of each of the image forming patterns (12) of each of the spatial frequency components in the case where no noise component is present matches an image forming contrast represented by the MTF (10), and the image forming contrast of the spatial frequencies f1, f2 and f3 becomes lower as the spatial frequencies decreases, as illustrated in FIG. 3B. Since the image forming contrast is present for spatial frequency components lower than fc', its resolution is represented as fc'.

Image forming patterns of the spatial frequency components in a case where a random noise is present, such as a case where the spatial frequency characteristic (11) of the noise component is widely present in a spatial frequency area as illustrated in FIG. 3A, are described next. If the spatial frequency characteristic (11) of the noise component has an intensity higher than the MTF (10) of the spatial frequency f3, image forming patterns (12') of components equal to or higher than the spatial frequency f3 are drowned by the noise component (13') and become invisible as illustrated in FIG. 3C. Therefore, the substantial resolution of the super-resolution image at this time becomes lower than f3.

International Publication Pamphlet No. 2006/109448 discloses a method for relatively reducing influences of a noise component by increasing the number of captured images.

SUMMARY OF THE INVENTION

One aspect of the present invention provides a super-resolution observation apparatus including an excitation light irradiation unit for irradiating, on a sample, excitation light intended to excite the sample, an excitation light modulation unit for modulating a spatial intensity distribution of the excitation light on the sample, an enlarged image forming unit for forming an enlarged image of the sample at an image position from observation light generated by irradiating the excitation light on the sample, an image capturing unit for converting the spatial intensity distribution of the enlarged image into digital image data, and a super-resolution processing unit for generating a super-resolution image obtained by making a super-resolution frequency component that is higher than a cutoff frequency of the enlarged image forming unit visible from one or a plurality of pieces of the digital image data. In the super-resolution observation apparatus, the super-resolution processing unit includes a spatial frequency intensity modulation unit that can change process contents according to an intensity level of a noise included in the digital image data.

BRIEF DESCRIPTION OF THE DRAWINGS

The present invention will be more apparent from the following detailed description when the accompanying drawings are referenced.

FIG. 4A illustrates an example of spatial frequency characteristics of an MTF of a super-resolution image, noise intensities included in digital image data, and spatial frequency filters;

FIG. 6 illustrates an example of a selection of a noise intensity included in digital image data, and a selection of a spatial frequency filter when an MTF of a super-resolution image is different;

FIG. 7C illustrates an example of a spatial frequency characteristic of a spatial frequency filter according to the first embodiment of the present invention, and a spatial frequency characteristic of a super-resolution MTF before and after the spatial frequency filters is operated;

FIG. 11 is an explanatory view of a spatial frequency characteristic of a wide-field image, and a spatial frequency characteristic of a super-resolution image before and after a spatial frequency filter is operated in the second embodiment of the present invention;

DESCRIPTION OF THE PREFERRED EMBODIMENTS

A spatial frequency intensity modulation unit according to the present invention can change process contents according to an intensity level of a noise included in digital image data. For ease of explanation, operations implemented when the spatial frequency intensity modulation unit switches and uses between a plurality of spatial frequency filters are described.

Figure 4B:
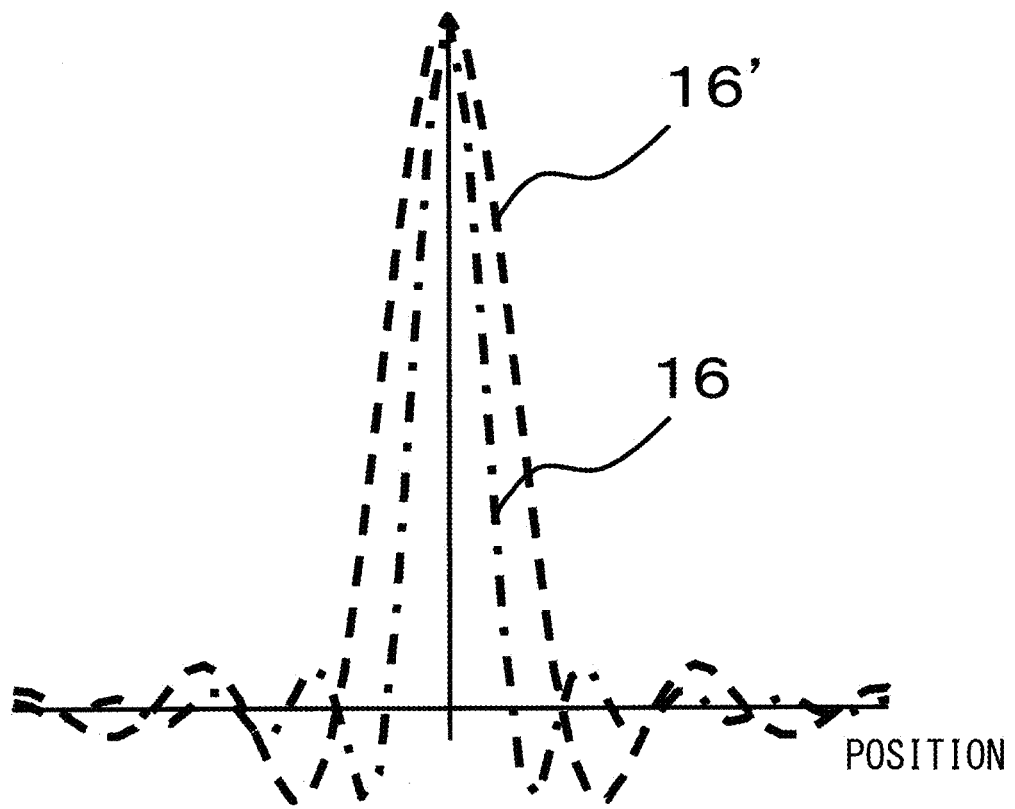
FIG. 4B illustrates an example of real space distributions of the spatial frequency filters.

FIG. 4A illustrates an example of spatial frequency characteristics of an MTF1 (14) of a super-resolution image in a super-resolution observation apparatus according to the present invention, noise intensities 1 (15) and 2 (15') included in digital image data, and switchable spatial frequency filters 1 (16) and 2 (16') included in the spatial frequency intensity modulation unit. FIG. 4B illustrates an example of real space distributions of the spatial frequency filters 1 (16) and 2 (16'). The MTF 1 (14) of a super-resolution image, which represents a ratio of a contrast expressed by spatial frequency components of the label concentration spatial frequency characteristic (8), represents that a contrast monotonously decreases within spatial frequencies lower than a cutoff frequency of the super-resolution image fc' as illustrated in FIG. 4A. A noise caused by an image capturing unit is a white noise typified by a shot noise in many cases, and a spatial frequency characteristic of its intensity has almost a constant value. A noise intensity varies depending on observation parameters, such as an intensity of illumination light, an image capturing time and the like, of the super-resolution observation apparatus. Here, assume that the two typical noise intensities 1 (15) and 2 (15') can occur.

The spatial frequency intensity modulation unit is provided with the two spatial frequency filters 1 (16) and 2 (16') having, as a cutoff frequency, a spatial frequency at an intersection between each of the noise intensities 1 (15) and 2 (15') and the MTF 1 (14) of the super-resolution image. The spatial frequency filters 1 (16) and 2 (16') are low-pass filters for cutting spatial frequency components equal to or higher than their cutoff frequency. If a sharp-cut filter is used as the spatial frequency filters 1 (16) and 2 (16'), spatial frequency components lower than their cutoff frequency are left unchanged, and spatial frequency components equal to or higher than their cutoff frequency are completely cut.

Figure 5A:
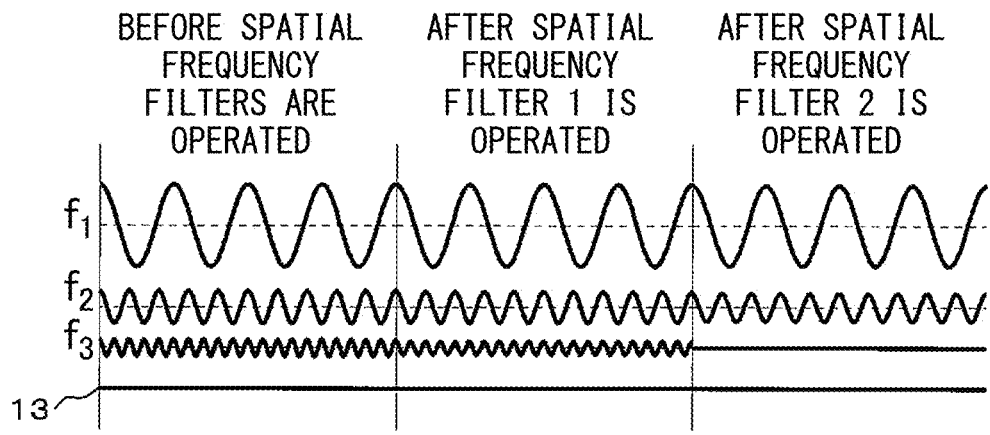
FIG. 5A is an explanatory view of operations of spatial frequency filters 1 and 2 when no noise is included in digital image data.
Figure 5B:
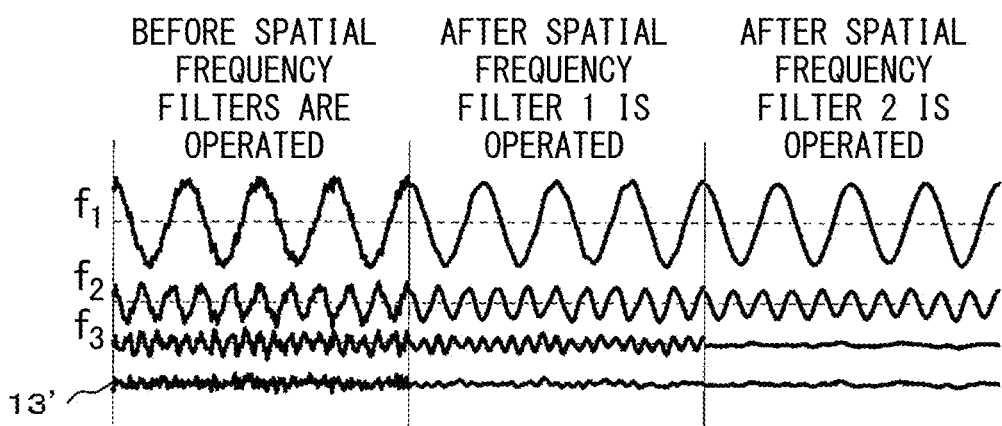
FIG. 5B is an explanatory view of operations of the spatial frequency filters 1 and 2 when a noise having a noise intensity 1 is included in the digital image data.
Figure 5C:
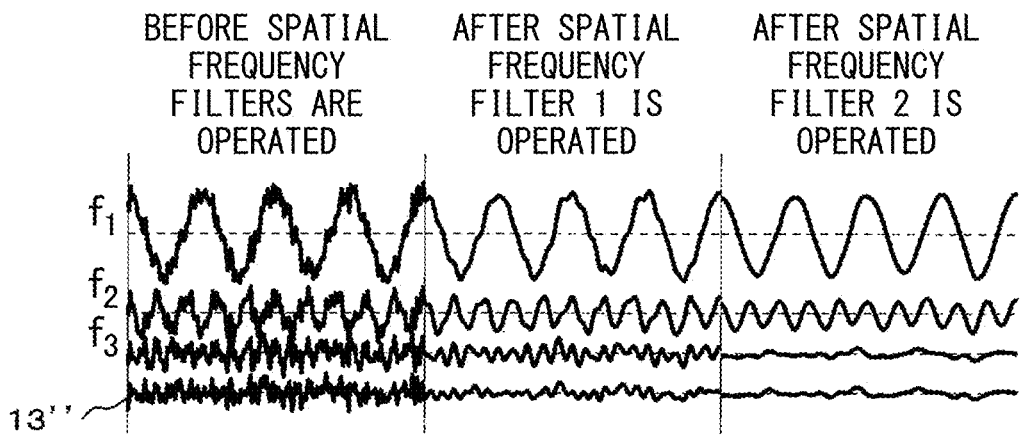
FIG. 5C is an explanatory view of operations of the spatial frequency filters 1 and 2 when a noise having a noise intensity 2 is included in the digital image data.

Operations of the spatial frequency filters 1 (16) and 2 (16') are described with reference to FIGS. 4A, 4B, 5A, 5B and 5C. FIGS. 5A, 5B and 5C are explanatory views of the operations of the spatial frequency filters 1 (16) and 2 (16') for the spatial frequencies f1, f2, f3 components illustrated in FIG. 4A in a case where no noise is included in the digital image data, and in a case where noises having intensities 1 (15) and 2 (15') are included in the digital image data. f1 is a frequency component that is lower than the cutoff frequency of the enlarged image forming unit 4 fc and is included in a wide-field image. f2 and f3 are super-resolution frequency components higher than fc. The cutoff frequency of the spatial frequency filter 1 (16) is higher than f3, whereas that of the spatial frequency filter 2 (16') is higher than f2 and lower than f3. If an intensity of a noise included in digital image data is 0, each of the spatial frequency components of the label concentration spatial frequency characteristic (8), which are included in the super-resolution image before the spatial frequency filters are operated, has a contrast of the MTF, which corresponds to each of the spatial frequencies, and forms a regularly sinusoidal wave as illustrated in FIG. 5A. Since the cutoff frequency of the spatial frequency filter 1 (16) is higher than f3, the components of the spatial frequencies f1, f2 and f3 are not changed by the spatial frequency filter 1 (16), and the contrast of the spatial frequency components is maintained. The spatial frequency filter 2 (16') cuts off the spatial frequency f3 component higher than its cutoff frequency, and reduces its image forming contrast to 0.

If the noise (15) having the noise intensity 1 is included in the digital image data, image forming of each of the spatial frequency components included in the super-resolution image before the spatial frequency filter is operated results in a form slightly distorted by a mixed noise as illustrated in FIG. 5B. After the spatial frequency filter 1 (16) is operated, a signal having almost no noise can be restored although the intensity is slightly modulated in a signal of each of the frequency components. However, when the spatial frequency filter 2 (16') is operated, the spatial frequency f3 component is cut off, and the resolution substantially decreases. In this case, by operating the spatial frequency filter 1 (16), the noise included in the super-resolution image can be significantly reduced without reducing the substantial resolution of the super-resolution image to f3 or lower.

If the noise (15') having the noise intensity 2 higher than the noise intensity 1 (15) is included in the digital image data, image forming of each of the spatial frequency components included in the super-resolution image before the spatial frequency filters are operated is further distorted by a mixed noise as illustrated in FIG. 5C. Especially, for the spatial frequency f3 component at which the MTF 1 (14) of the super-resolution image is lower than the noise intensity 2 (15'), it is very difficult to estimate a proper form of a label concentration spatial distribution based on its image forming. Also after the spatial frequency filter 1 (16) is operated, image forming of the spatial frequency f3 component is significantly distorted from a signal in a case where no noise is present, leading to a spurious resolution that can possibly cause a misinterpretation of an observer. If the spatial frequency filter 2 (16') is operated, the spatial frequency f3 component is cut off, and image forming of spatial frequency components equal to lower than f2 of the label concentration spatial frequency characteristic (8) is satisfactorily restored although the substantial resolution of the super-resolution image becomes lower than f3. Accordingly, in this case, operating the spatial frequency filter 2 (16') is more preferable for the observer because the super-resolution frequency component (f2) is made visible while preventing the spurious resolution.

In some cases, it is preferable that a spatial frequency filter is given by a spatial frequency characteristic as illustrated in FIG. 4A and operated by being multiplied by a Fourier transform of the image, because a cutoff frequency of the super-resolution image after the spatial frequency filter is operated can be made definite. In other cases, it is more preferable that the spatial frequency filter is given by an intensity distribution in a real space as illustrated in FIG. 4B and operated by performing a convolution for a super-resolution image itself, because the amount of a calculation is reduced, leading to a speedup of the calculation.

Additionally, a specific configuration of the spatial frequency intensity modulation unit may be implemented not by providing the unit with a plurality of spatial frequency filters as described above but by switching between forms of spatial frequency filters according to observation parameters of the super-resolution observation apparatus 1. If a correlation is expected between any of the observation parameters and a noise intensity, process contents of the spatial frequency intensity modulation unit may be changed based on a corresponding observation parameter.

Here, the observation parameters include illumination parameters of the excitation light illumination unit (2), modulation parameters of the excitation light modulation unit (3), image forming parameters of the enlarged image forming unit (4), image capturing parameters of the image forming unit (5), and the like. The illumination parameters include an intensity and a wavelength of illumination light, a numerical aperture of irradiation on a sample, an irradiation angle, a pupil amplitude distribution, and additionally include a pulse width, a wavelength band, a momentary intensity, a pulse waveform and the like if illumination light is pulsed light. If a correlation is expected between any of the above described parameters and the noise intensity, process contents of the spatial frequency intensity modulation unit may be changed based on a corresponding illumination parameter. The modulation parameters include a modulation pattern, a modulation speed, and the like. If a correlation is expected between any of the modulation parameters and the noise intensity, process contents of the spatial frequency intensity modulation unit may be changed based on a corresponding modulation parameter. The image forming parameters include a numerical aperture of an objective lens, a magnification ratio, a transmissive wavelength band, and the like. If a correlation is expected between any of the image forming parameters and the noise intensity, process contents of the spatial frequency intensity modulation unit may be changed based on a corresponding image forming parameter. The image capturing parameters include a pixel size of the image capturing unit, a light sensitive characteristic, a quantum efficiency, a gain, a saturation level, an exposure time, a cooling temperature, a read noise, a thermal noise, a noise reduction, and the like. If a correlation is expected between any of the image capturing parameters and the noise intensity, process contents of the spatial frequency intensity modulation unit may be changed based on a corresponding image capturing parameter.

If excitation light is laser light, a laser speckle noise is included in digital image data in many cases. Therefore, it is preferable that the super-resolution observation apparatus includes a spatial frequency intensity modulation unit able to change process contents according to an intensity level of the speckle noise. The intensity level of the speckle noise mainly depends on scattering caused by dust or a flaw present in an optical system, diffraction at an edge of an aperture stop, stray light caused by reflection on a surface of an optical element, or the like. However, the intensity level of the noise varies depending on an output, a wavelength and a wavelength band of the laser light, or a pulse width if the laser light is pulsed laser light.

For a faint light observation such as a fluorescence observation or the like, a photon noise is dominant as a noise included in digital image data. The number of photons received during an exposure time fluctuates according to a Poisson distribution within the image capturing unit 5, so that the photon noise is caused. Since a relative intensity of the noise increases with a decrease in the number of received photons, a large number of photons are needed to generate a super-resolution image having a highly effective resolution. In this case, the Poisson distribution is approximated by a normal distribution, and a square root $\sqrt{N}$ of the number of received photons N appears as fluctuations of brightness of digital image data. Accordingly, the photon noise is expected to correlate with an exposure time, brightness of image data, and a quantum efficiency of an image capturing element. The process contents of the spatial frequency intensity modulation unit may be changed based on these parameters.

If the spatial frequency filter is operated as a convolution filter in a real space, a random noise can be effectively suppressed by increasing a size of the convolution filter. In contrast, the length of time needed for a calculation process can be shortened by downsizing the convolution filter. Therefore, the size of the convolution filter may be changed according to the intensity level of a noise, the above described parameters, or the like.

Also an MTF of a super-resolution image may sometimes differ depending on an observation parameter. For example, even if the noise intensity (15) included in digital image data is the same as illustrated in FIG. 6, MTF1 and MTF2 correspond to different spatial frequencies at which the noise intensity and a contrast of MTF in the super-resolution image become equal. Therefore, process contents of the spatial frequency intensity modulation unit may be changed to select the spatial frequency filter 1 (16) if the super-resolution image has the spatial frequency characteristic of the MTF 1 (14), or to select the spatial frequency filter 2 (16') if the super-resolution image has the spatial frequency characteristic of the MTF 2 (14').

As described above, the process contents of the spatial frequency intensity modulation unit are changed according to an intensity level of a noise included in digital image data, whereby a technique of generating a super-resolution image with a low noise and high visibility of a super-resolution frequency component can be provided even if an intensity of a noise included in digital image data differs.

Embodiments are specifically described below.

<First Embodiment>

Figure 7A:
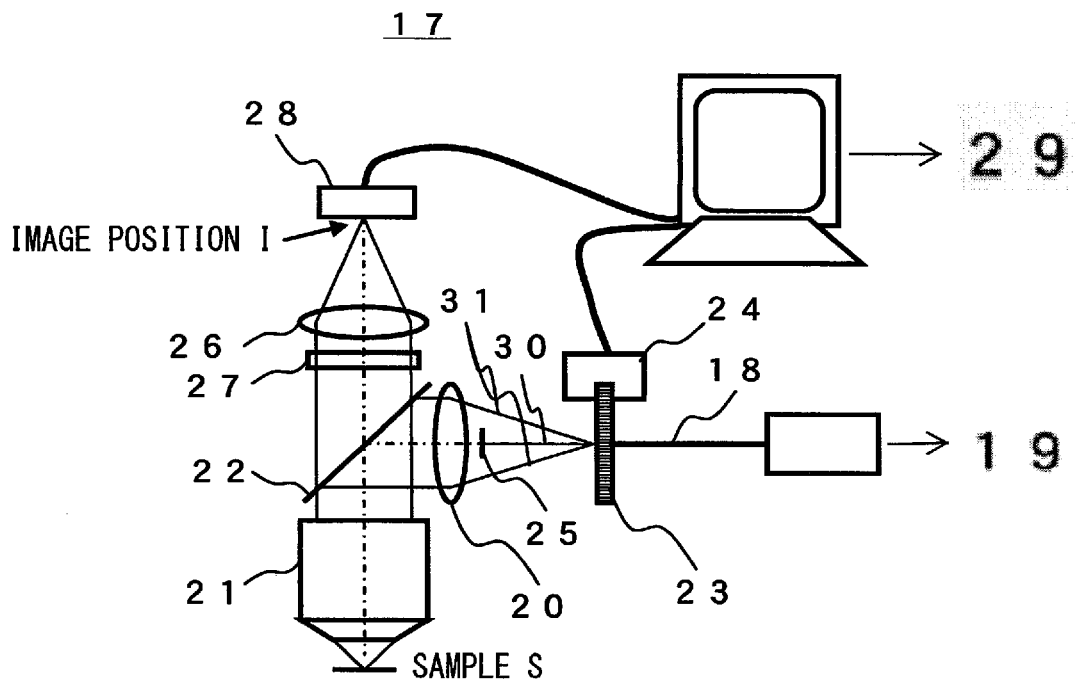
FIG. 7A illustrates a configuration of a super-resolution observation apparatus according to a first embodiment of the present invention.
Figure 7B:
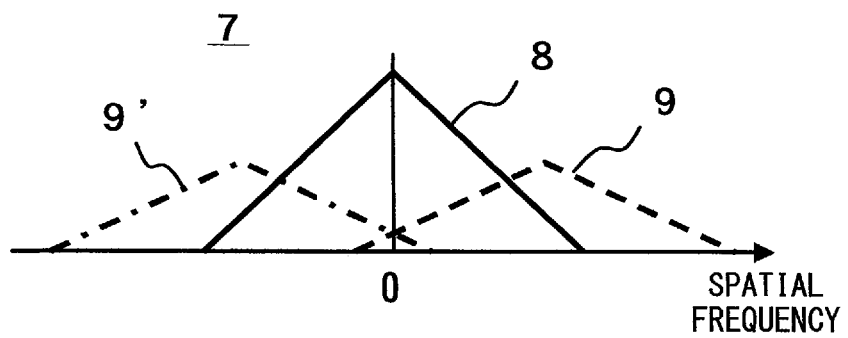
FIG. 7B is an explanatory view of a spatial frequency characteristic of an intensity distribution of fluorescence on a sample S according to the first embodiment of the present invention.

One embodiment carried out by applying the present invention to an SIM is described with reference to FIGS. 7A, 7B and 7C. A super-resolution observation apparatus (17) according to this embodiment is configured by including: an excitation light illumination unit (2) composed of a laser light source (19) for emitting laser light (18) that is excitation light for exciting a label molecule contained in a sample S, a combination, intended to gather the laser light at a sample observation position, of an illumination lens (20) and an objective lens (21), and a dichroic mirror (22) for bending the laser light (18) between the illumination lens (20) and the objective lens (21); an excitation light modulation unit (3) composed of a diffraction grating (23) arranged at a position conjugate with the sample S within the excitation light illumination unit (2), a driving device (24) for changing a position and an orientation of the diffraction grating (23), and a stopper (25), arranged within a light path between the diffraction grating (23) and the sample S, for partially shielding the illumination light path; an enlarged image forming unit (4) composed of a tube lens (26) that collaborates with the objective lens (21), and enlarges and projects fluorescence generated from the label molecule within the sample S to an image position I, the dichroic mirror (22) having an increased transmission of the fluorescence so that the fluorescence goes straight from the objective lens (21) to the tube lens (26), and a block filter (27) for blocking a wavelength of the excitation light so as to prohibit the excitation light from reaching the image position I; an image capturing unit 5 composed of a CCD camera (28) for generating digital image data by putting an intensity distribution of the fluorescence at the image position I into numerical values; and a super-resolution processing unit (6) composed of a calculation machine (29) for generating a super-resolution image by using the digital image data of the intensity distribution of the fluorescence at the image position I, which is collected while varying the position and the orientation of the diffraction grating (23) with the driving device (24).

When the laser light (18) emitted from the laser light source (19) passes through the diffraction grating (23), 0th-order diffraction light (30) and ±1st-order diffraction light (31) occur. The 0th-order diffraction light (30) goes straight within the optical path and is blocked by the stopper (25) arranged halfway on the optical path, and the ±1st-order diffraction light (31) is made to meet and interfere with the sample S at a predetermined angle by the objective lens (21), so that the intensity distribution of the excitation light is generated.

On the sample S, fluorescence having an intensity distribution proportional to a multiplication of an intensity distribution of the excitation light and a concentration distribution of the label molecule within the sample locally occurs. In the spatial frequency characteristic (7) of the intensity distribution of the fluorescence on the sample S, the label concentration spatial frequency characteristic (8) that occurs when excitation light having a uniform intensity distribution is irradiated on the sample S, and shift components (9, 9') that are generated from a non-uniform intensity distribution of the excitation light on the sample S and respectively have a center shifted from an origin are combined with a certain linear combination constant determined by the intensity distribution of the excitation light on the sample S.

Figure 1:
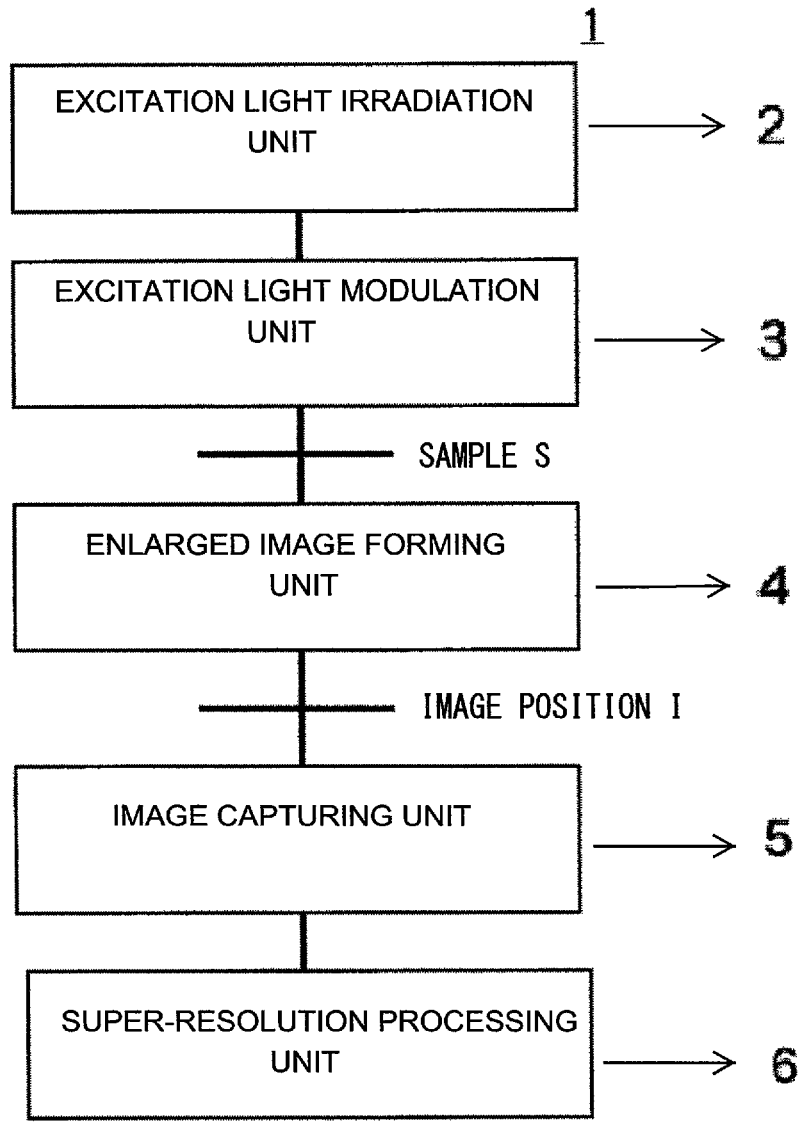
FIG. 1 illustrates a basic configuration of a conventional super-resolution observation apparatus.
Figure 2A:
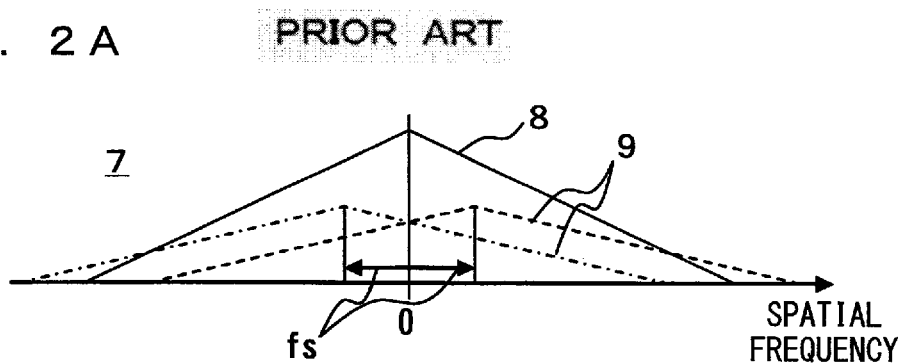
FIG. 2A is an explanatory view of an observation light intensity spatial frequency characteristic on a sample S.
Figure 2B:
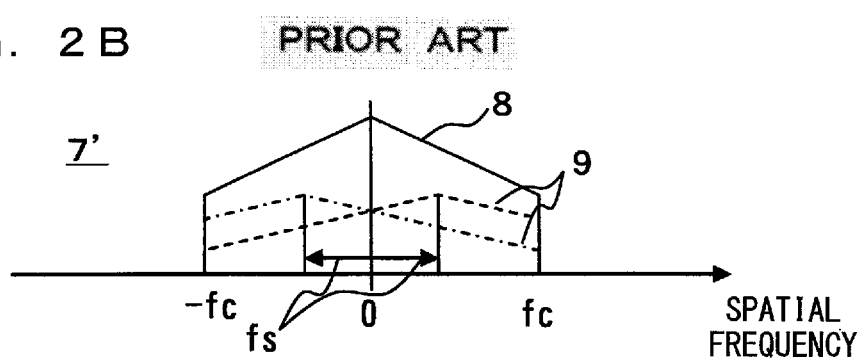
FIG. 2B is an explanatory view of an observation light intensity spatial frequency characteristic at an image position I.
Figure 2C:
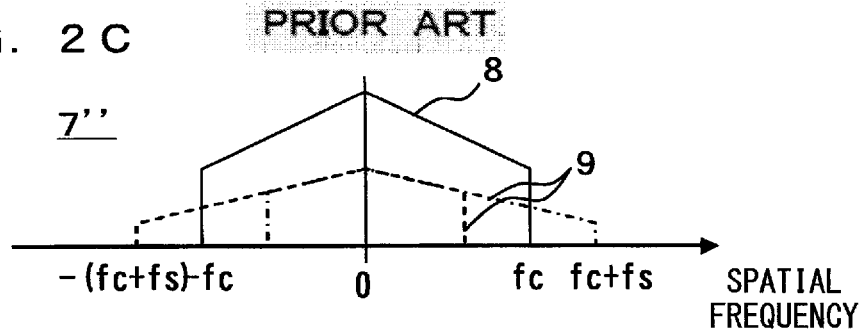
FIG. 2C is an explanatory view of a spatial frequency characteristic of a super-resolution image for which a super-resolution process has been executed.
Figure 3A:
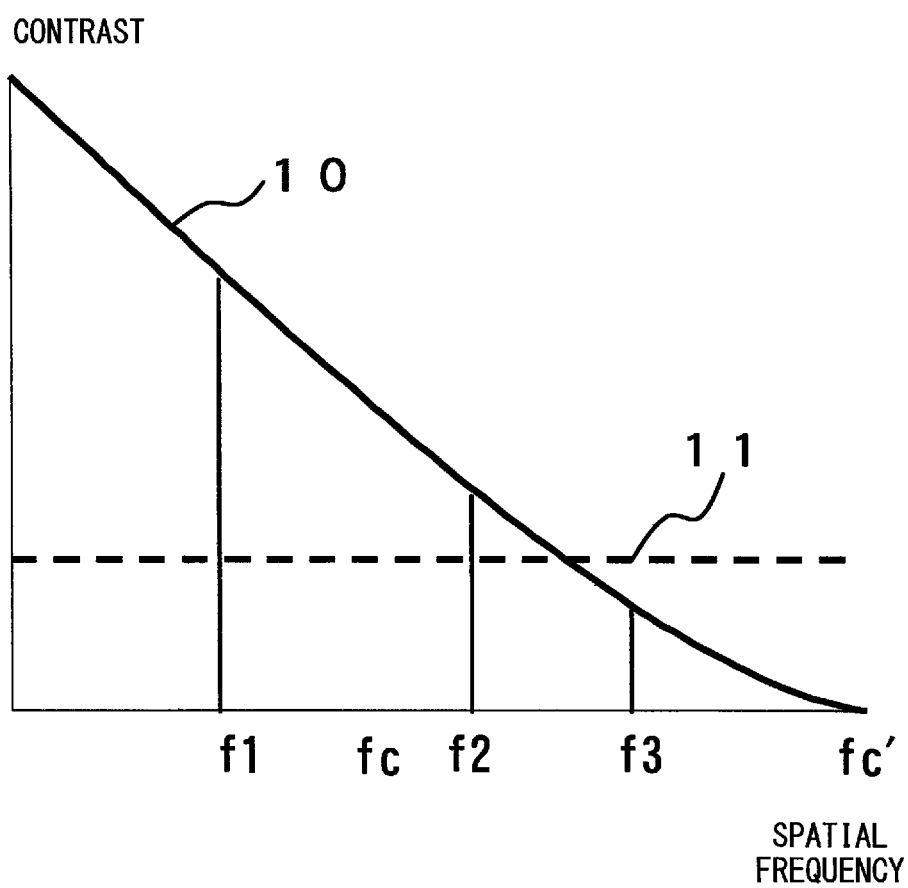
FIG. 3A illustrates an example of a transfer function (MTF), and a spatial frequency characteristic of a noise component.
Figure 3B:
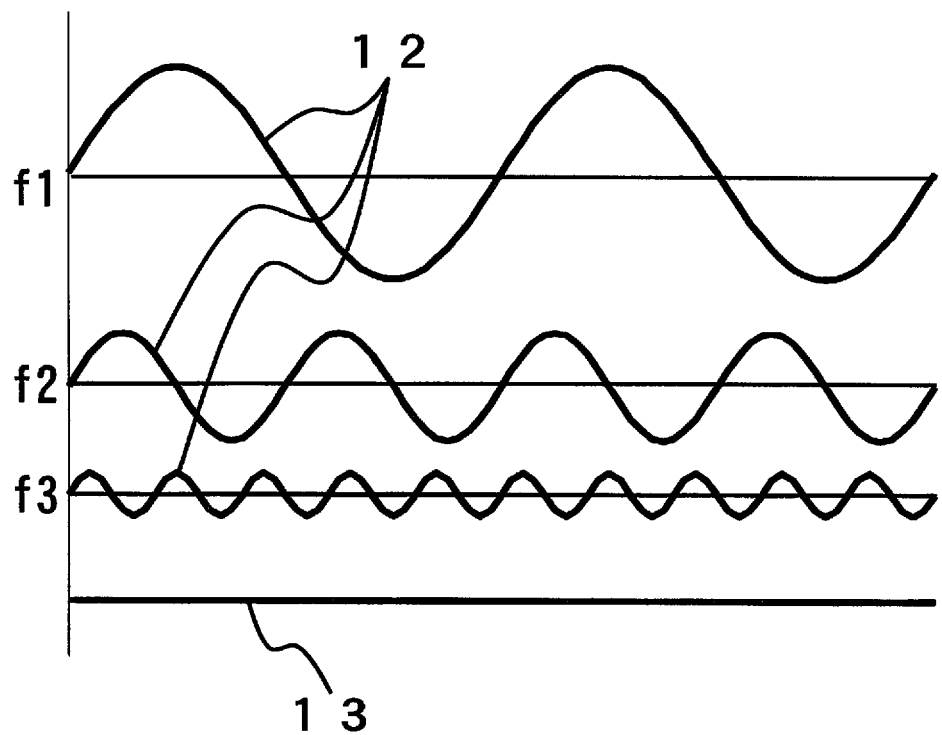
FIG. 3B illustrates an example of image forming patterns of spatial frequency components illustrated in FIG. 3A in a case where no noise is present.
Figure 3:
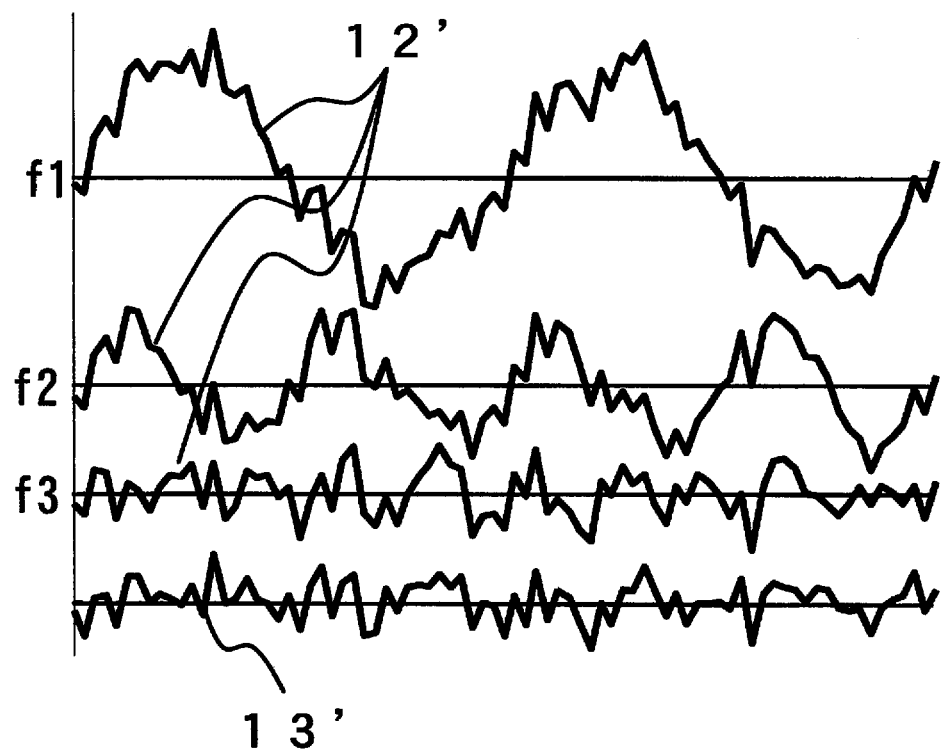
FIG. 3C illustrates an example of image forming patterns of the spatial frequency components illustrated in FIG. 3A in a case where a noise is present.

The calculation machine (29) initially generates a super-resolution image from digital image data captured by the CCD camera (28) with the procedures described above with reference to FIG. 2. At this time, a noise (32) derived from a laser light speckle mixes in the super-resolution image as illustrated in FIG. 7C. Before the spatial frequency filter is operated, a spurious resolution is exhibited in an area equal to or higher than the spatial frequency fc'1 where the intensity of the noise (32) derived from the laser light speckle is higher than the MTF (33) of the super-resolution image before the spatial frequency filter is operated. This makes it difficult for an observer to properly recognize the label spatial distribution within the sample. Accordingly, the spatial frequency filter (16), which is a low-pass filter having a cutoff frequency fc'1, is operated for the super-resolution image. In the super-resolution image after the low-pass filter (16) is operated, although the cutoff frequency results in fc'1 and the resolution limit somewhat drops, the spurious resolution caused by the speckle noise (32) derived from the laser light becomes unnoticeable, and at the same time, super-resolution frequency components equal to or lower than the spatial frequency fc'1 can be made visible properly.

Figure 8A:
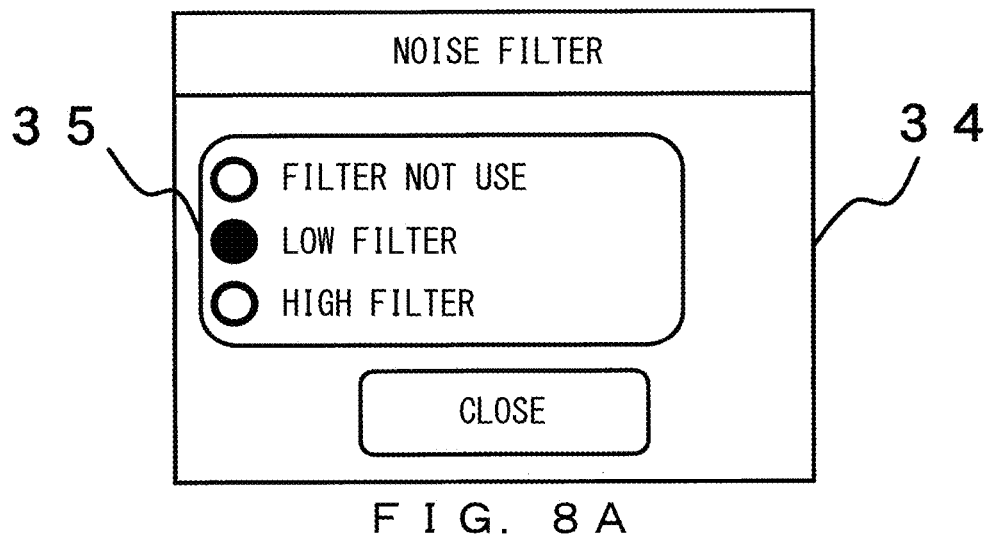
FIG. 8A illustrates an example of a GUI of a radio button type that enables a selection of not operating a noise filter according to the first embodiment of the present invention, and a selection of operating either of high and low noise filters.
Figure 8B:
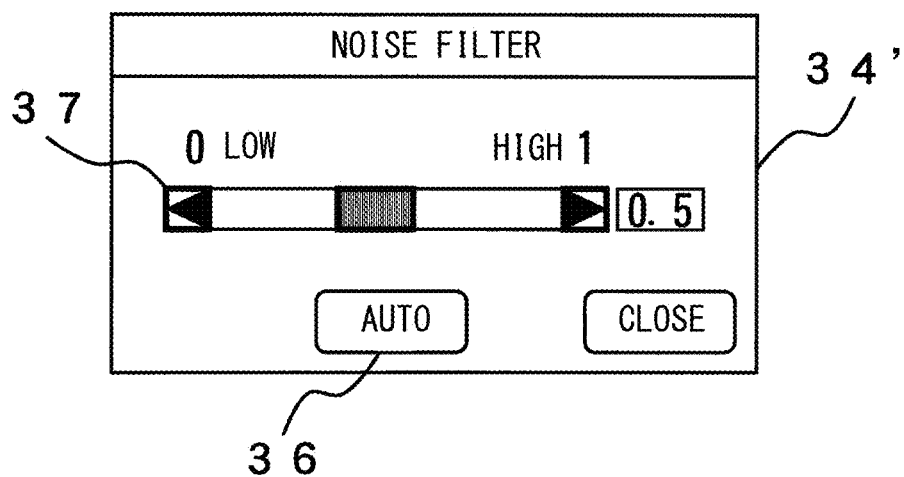
FIG. 8B illustrates an example of a GUI of a slider type that can continuously vary a cutoff frequency of the noise filter according to the first embodiment of the present invention.
Figure 8C:
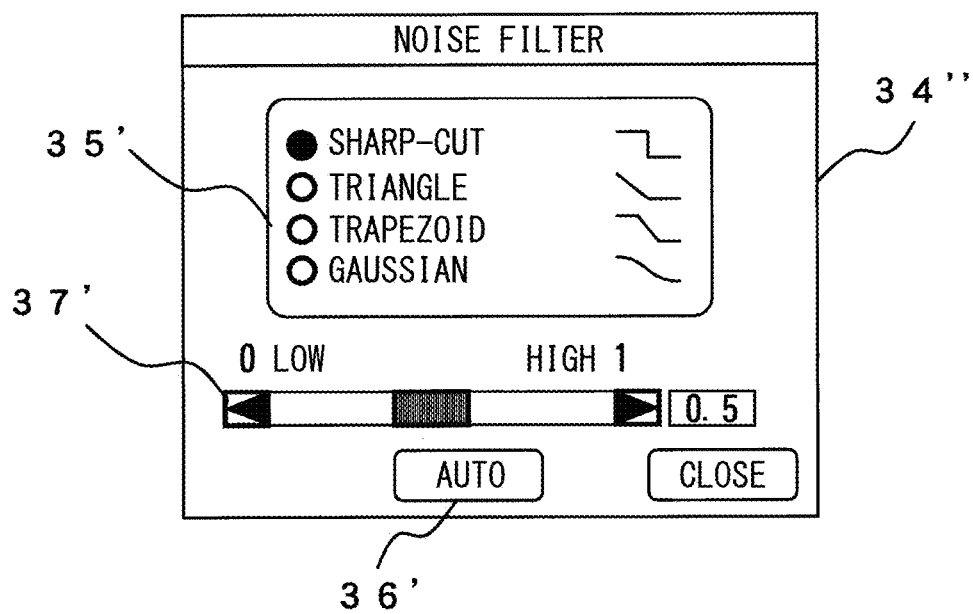
FIG. 8C illustrates a GUI having radio buttons for selecting a noise filter type according to the first embodiment of the present invention, a slider that can continuously vary a cutoff frequency, and an auto setting button.

An example of a GUI (Graphical User Interface) for setting noise filters is described next with reference to FIGS. 8A, 8B and 8C. The cutoff frequency fc'1 to be set for the low-pass filter (16) varies depending on the intensity level of the noise (32). Therefore, setting screens (34, 34', 34") for the noise filters are displayed on a monitor screen of the calculation machine (29). FIG. 8A illustrates an example of a GUI on which radio buttons (35) that enable a selection of not operating the noise filters, and a selection of operating either of high and low noise filters having a different cutoff frequency fc'1 shows. An observer can suitably select an appropriate one from among the spatial frequency filters while viewing a super-resolution image. FIG. 8B illustrates an example where the cutoff frequency fc'1 of the noise filter can be continuously varied with a GUI of a slider type. An observer can finely set the noise filter while viewing a super-resolution image. Additionally, the observer can automatically set the intensity of the noise filter by selecting an auto setting button (36) based on various observation parameters. FIG. 8C illustrates an example of a GUI having radio buttons (35') for selecting a noise filter type, a slider (37') that can continuously vary the cutoff frequency fc'1, and an auto setting button (36'). A noise filter type can be selected from among a sharp-cut type, a triangle type, a trapezoid type, and a Gaussian type. Therefore, the observer can select an optimum noise filter type while viewing a super-resolution image after the filter is operated. Furthermore, the cutoff frequency fc'1 can be finely set for each type with the slider for setting an intensity, or can be automatically set with the auto setting button (36').

Therefore, with the SIM according to this embodiment, a technique of generating a super-resolution image having high visibility of a super-resolution frequency component while effectively removing a noise even if an intensity of the noise included in a captured image varies can be provided.

<Second Embodiment>

Figure 9A:
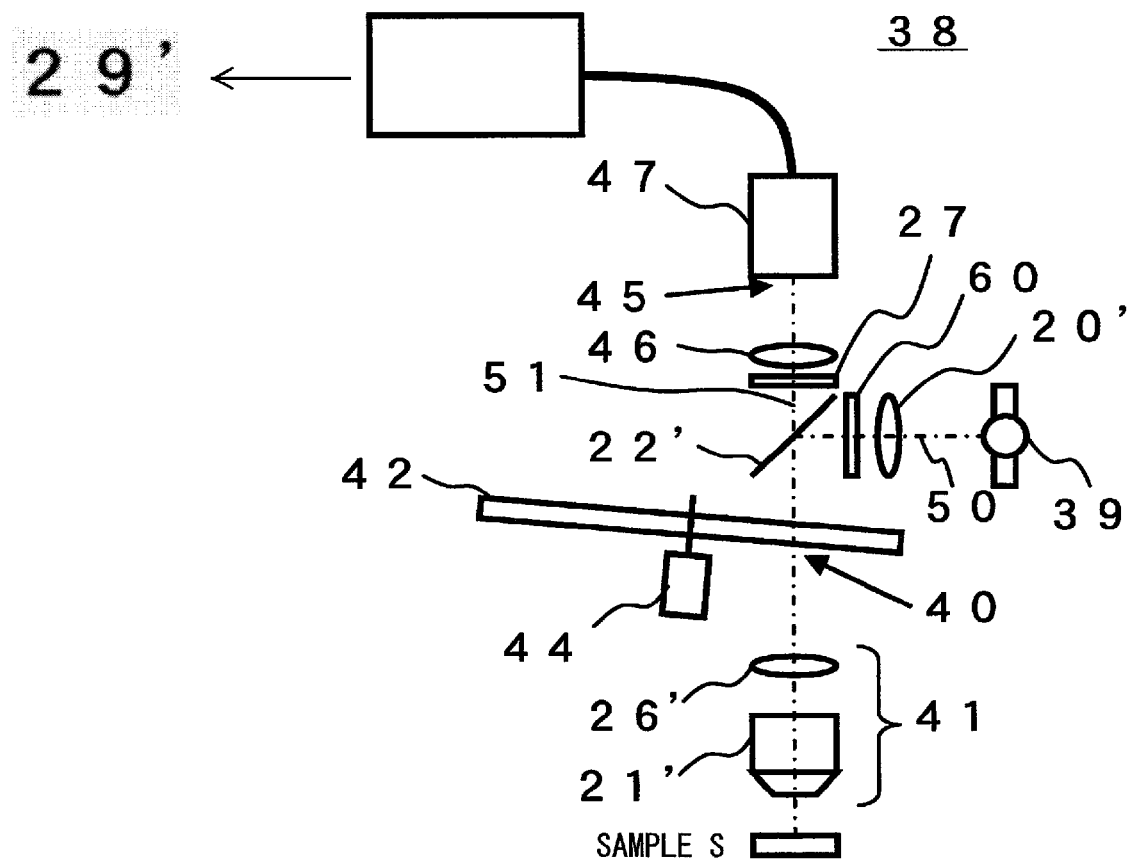
FIG. 9A illustrates a configuration of a super-resolution observation apparatus according to a second embodiment of the present invention.
Figure 9B:
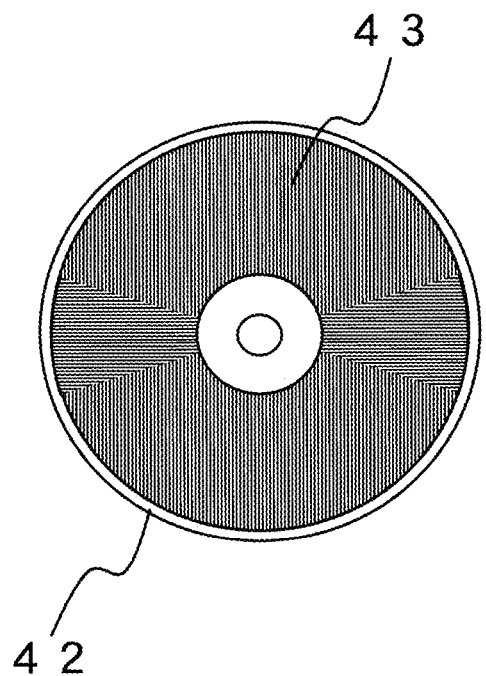
FIG. 9B illustrates a modulation pattern on a scan mask according to the second embodiment of the present invention.
Figure 9C:
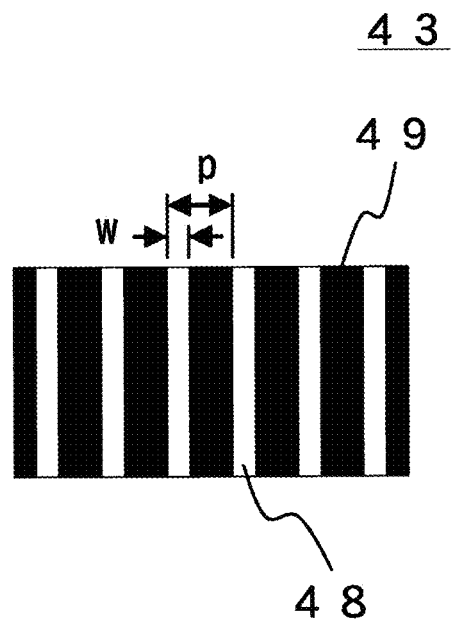
FIG. 9C illustrates an example of a modulation pattern according to the second embodiment of the present invention.

A super-resolution observation apparatus (38), configured as illustrated in FIG. 9A, according to another embodiment of the present invention is a fluorescence microscope for observing a sample S, which is a fluorescence sample. The fluorescence microscope includes a mercury lamp (39) for generating excitation light intended to excite the sample S, an intermediate image forming optical system (41) for projecting the excitation light onto the sample S and for forming an intermediate image of the sample Sat an intermediate image position (40) from fluorescence, which is observation light generated by irradiating the excitation light on the sample S, a scan mask (42) for modulating spatial intensity distributions of the excitation light and the intermediate image at the intermediate image position (40), a motor (44) for moving a modulation pattern (43) possessed by the scan mask (42) relative to the intermediate image as illustrated in FIG. 9B, an image capturing lens (46) for relaying the intermediate image the spatial intensity distribution of which is modulated with the modulation pattern (43) onto an image capturing surface (45), a CCD (47) for converting the spatial intensity distribution of the intermediate image relayed onto the image capturing surface (45) into digital image data, and a calculation machine (29') for executing a super-resolution process for the digital image data.

The intermediate image forming optical system (41) includes an objective lens (21') and a tube lens (26'). At a position where an illumination light path (50) and an observation light path (51) intersect with each other, a dichroic mirror (22') is arranged. Between the mercury lamp (39) and the dichroic mirror (22'), an illumination lens (20') is arranged. A projection magnification and a relay magnification of the intermediate image forming optical system (41) and the image capturing lens (46) may be variable.

The modulation pattern (43) possessed by the scan mask (42) is, for example, a periodic aperture pattern including an aperture portion (48) that is interposed between shielded portions (49) and has an aperture width w and a period p. The scan mask (42) is rotated by being driven by the motor (44), so that the modulation pattern (43) possessed by the scan mask (42) moves relative to the intermediate image position (40).

A cutoff frequency of the image capturing lens (46) and a Nyquist frequency of the CCD (47) are higher than the cutoff frequency of the intermediate image forming optical system (41) fc. Note that, in this specification, a comparison among the cutoff frequency of the intermediate image forming optical system (41), the cutoff frequency of the image capturing lens (46), and the Nyquist frequency of the CCD (47) is made based on a frequency standardized by taking into account a projection magnification of the sample S at the intermediate image position (40) and a projection magnification of the intermediate image position (40) onto the image capturing surface (46).

The calculation machine (29') is configured to execute, for the digital image data obtained by the CCD (47), a process for enhancing a high-frequency component higher than the cutoff frequency of the intermediate image forming optical system (40) fc.

With the fluorescence microscope configured in this way, a super-resolution frequency component can be recorded to digital image data obtained by the CCD (47). This is implemented in a way such that the scan mask (42) modulates a spatial intensity distribution of excitation light on the sample S while continuously varying the position of the modulation pattern (49) with rotations, and in addition, a spatial intensity distribution of a fluorescence image of the sample S at the intermediate image position (40) is demodulated.

Figure 10A:
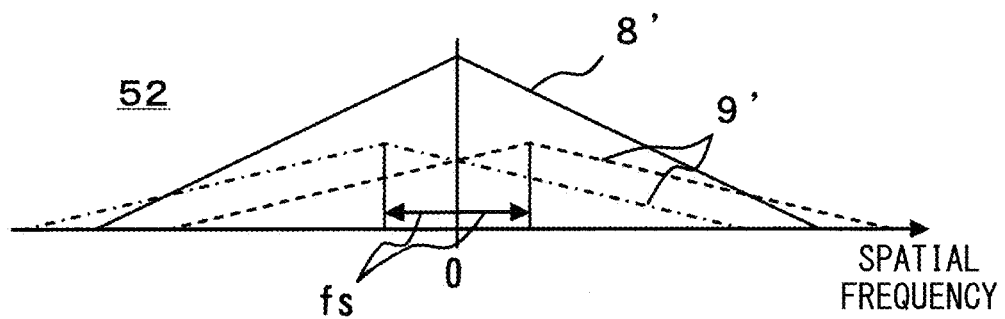
FIG. 10A is an explanatory view of a fluorescence intensity spatial frequency characteristic on a sample in the second embodiment of the present invention.
Figure 10B:
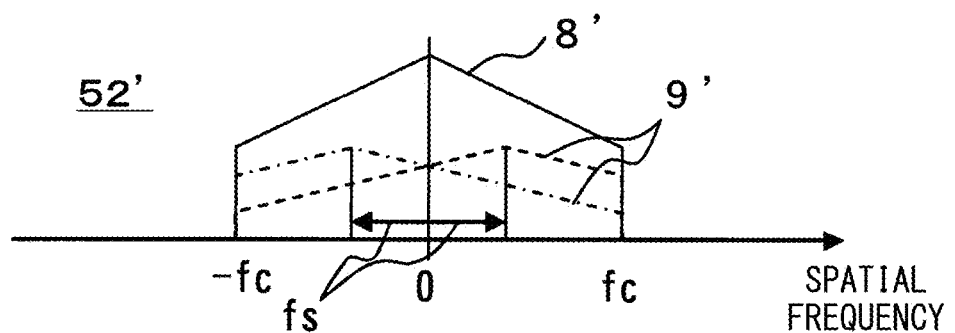
FIG. 10B illustrates a fluorescence intensity spatial frequency characteristic at an intermediate image position in the second embodiment of the present invention.
Figure 10C:
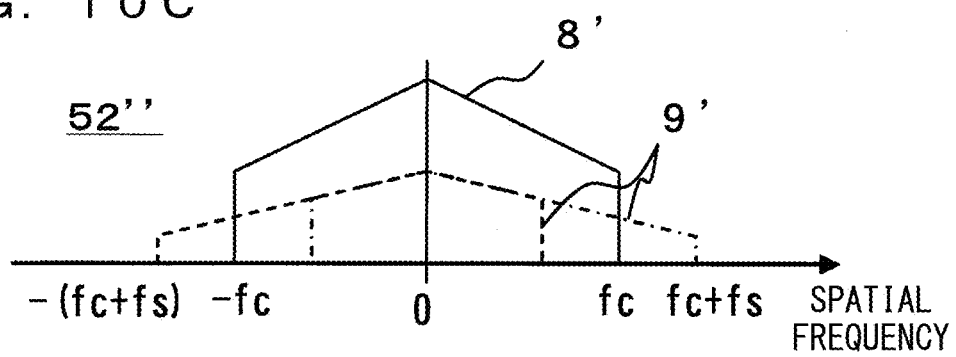
FIG. 10C illustrates a fluorescence intensity spatial frequency characteristic after fluorescence passes through a scan disk in the second embodiment of the present invention.

More specifically, the excitation light that has passed through the modulation pattern (49) is projected onto the sample S, so that a fluorescence intensity spatial frequency characteristic (52) on the sample S includes a label concentration spatial frequency characteristic (8'), and shift components (9') caused by shifting the label concentration spatial frequency by a spatial frequency ±fs corresponding to an inverse number of the period p of the modulation pattern (49) as illustrated in FIG. 10A. As the fluorescence intensity spatial frequency characteristic (52') at the intermediate image position (40) immediately before the fluorescence passes through the scan mask (42), only spatial frequency components having an absolute value equal to or lower than fc in the fluorescence intensity spatial frequency characteristic (52) on the sample S are transmitted by the intermediate image forming optical system (41). In the fluorescence intensity spatial frequency characteristic immediately after the fluorescence has passed through the scan mask (42), a fluorescence intensity spatial frequency characteristic (52') at the intermediate image position (40), and shift components caused by shifting the spatial frequency by ±fs occur as illustrated in FIG. 10B. However, as illustrated in FIG. 10C, only components having a total spatial frequency shift that results in 0 by being integrated during the move of the pattern (49) in the period p remain, so that a super-resolution image is formed. Also the modulation pattern (49) is rotated with rotations of the scan mask (42) driven by the motor (44), so that digital image data having an isotropic resolution is recorded to the CCD (47).

A linear combination coefficient of shift components included in digital image data is generally small, and super-resolution frequency components higher than fc are not made visible sufficiently as they are. Accordingly, the image processing unit corrects a spatial frequency characteristic.

FIG. 11 illustrates spatial frequency characteristics of a wide-field image (53), a super-resolution image (54) before a spatial frequency characteristic is corrected, a spatial frequency filter (55), and a super-resolution image (56) after the spatial frequency characteristic is corrected by the spatial frequency filter (55), for an explanation of a principle of making a super-resolution frequency component visible by correcting a spatial frequency characteristic in this embodiment. A vertical axis of the spatial frequency filter (55) is illustrated on the right side on a scale different from a vertical axis (on the left side) of other elements. In the spatial frequency characteristic of the super-resolution image (54) before the spatial frequency characteristic is corrected, a super-resolution frequency component of a spatial frequency higher than the cutoff frequency of the wide-field image (53) fc is present. However, since its contrast is low, the super-resolution frequency component is not made visible sufficiently. In the super-resolution image after being corrected by operating the spatial frequency filter (55) for enhancing a contrast of the super-resolution frequency component for the image before the above described process, the contrast of the super-resolution frequency component is increased and made visible. This spatial frequency filter (55) has an especially high amplification factor in a spatial frequency area higher than fc.

Data processes executed by the calculation machine (29') sometimes include image processes for finishing a super-resolution image to have a characteristic more preferable for a user, such as a process for adjusting a brightness value, a process for making a pseudo-color display, and the like.

Figure 12A:
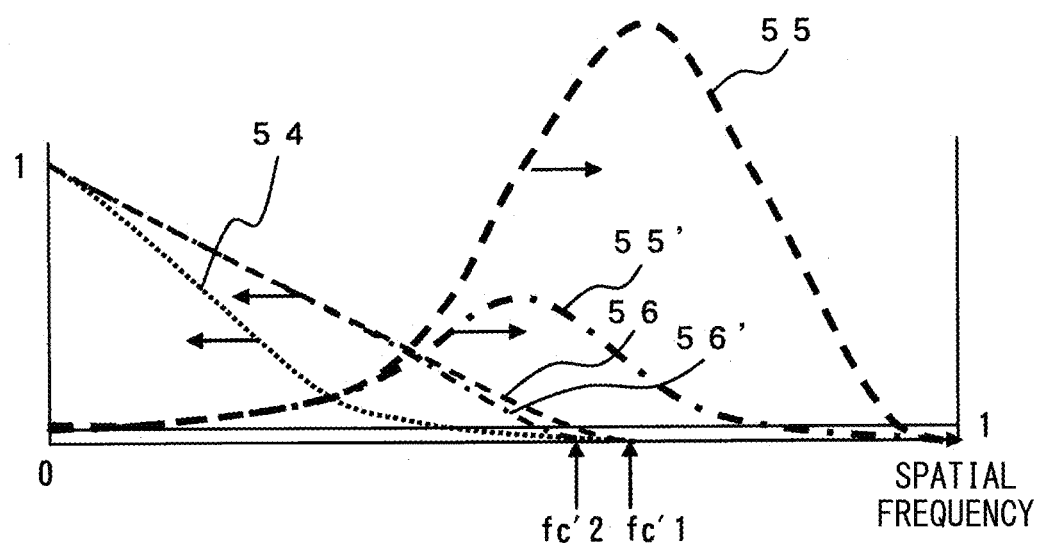
FIG. 12A illustrates an example of spatial frequency characteristics of two spatial frequency filters, and a super-resolution image before and after a spatial frequency characteristic is corrected in a case where no noise is included in digital image data in the second embodiment of the present invention.
Figure 12B:
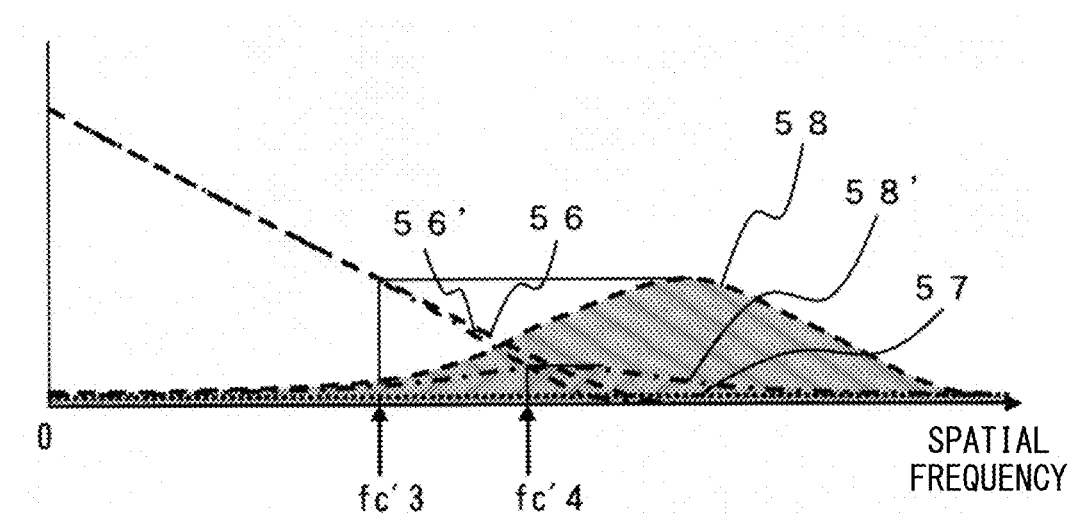
FIG. 12B illustrates an example of spatial frequency characteristics of two spatial frequency filters, and a super-resolution image before and after a spatial frequency characteristic is corrected in a case where a noise is included in digital image data in the second embodiment of the present invention.

FIGS. 12A and 12B illustrate examples of spatial frequency characteristics of two spatial frequency filters 1 (55) and 2 (55'), a super-resolution image (54) before the spatial frequency filters are operated, and super-resolution images (56, 56') after the spatial frequency characteristic is corrected respectively by the spatial frequency filters 1 (55) and 2 (55') in this embodiment.

The spatial frequency filter 1 (55) is a spatial frequency filter designed to make a visible resolution of a super-resolution image highest after the spatial frequency filter 1 (55) is operated in a case where a noise included in digital image data is low enough to be ignorable. Accordingly, an amplification factor of a contrast implemented by the spatial frequency filter 1 (55) monotonously increases up to a theoretical resolution limit of the super-resolution image from a low-frequency side toward a high-frequency side, and becomes highest in the vicinity of fc'1.

In the meantime, the spatial frequency filter 2 (55') is a spatial frequency filter designed so that a visible resolution of a super-resolution image after the spatial frequency filter 2 (55') is operated becomes higher than that in a case of operating the spatial frequency filter 1 (55), if a noise (57) included in digital image data is high to a certain degree. Accordingly, an amplification factor of the contrast implemented by the spatial frequency filter 2 (55') is almost the same as that of the spatial frequency filter 1 (55) in a low spatial frequency area. However, the amplification factor has a maximal value at a spatial frequency fc'2 lower than fc'1, and decreases at spatial frequencies higher than the peak position. Namely, the amplification factor has values lower than the spatial frequency filter 1 (55). If the noise included in digital image data is ignorable, the substantial cutoff frequency fc'2 of the super-resolution image after the spatial frequency filter 2 is operated has a value lower than fc'1 obtained when the spatial frequency filter 1 (55) is operated as illustrated in FIG. 12A.

A characteristic of a noise included in a super-resolution image after the spatial frequency filters 1 (55) and 2 (55') are operated in a case where the noise (57) included in digital image data is high to a certain degree is described with reference to FIG. 12B. The noise (57) included in the digital image data has an almost flat spatial frequency characteristic. However, noise components in a spatial frequency area equal to or higher than fc are especially amplified in the super-resolution image for which the spatial frequency filters are operated. A substantial cutoff frequency fc'3 of the super-resolution image after the spatial frequency filter 1 (55) is operated becomes lower than the cutoff frequency fc'1 in a case where no noise is present due to a noise component (58) included in the super-resolution image. Also a substantial cutoff frequency fc'4 after the spatial frequency filter 2 (55') is operated similarly becomes lower than a cutoff frequency fc'2 in a case where no noise is present. Since the latter has a lower intensity of the noise, fc'4 becomes higher than fc'3. In this case, more preferable results are obtained by using the spatial frequency filter 2 (55').

Accordingly, in this embodiment, it is desirable to switch and use between spatial frequency filters to be used according to a level of the noise (57) included in digital image data.

Also in this embodiment, a cutoff frequency or a maximal value of an amplification factor of a contrast can be made continuously changeable, or a plurality of types of spatial frequency filters can be made selectable instead of selecting and using between the above described two spatial frequency filters. Its effects are similar to those of the first embodiment.

As described above, the super-resolution observation apparatus according to this embodiment can provide a technique of generating a super-resolution image having high visibility of a super-resolution frequency component even if an intensity of a noise included in a captured image differs.

What is claimed is:

1. A super-resolution observation apparatus, comprising:
an excitation light irradiation unit for irradiating excitation light intended to excite a sample on the sample;
an excitation light modulation unit for modulating a spatial intensity distribution of the excitation light on the sample;
an enlarged image forming unit for forming an enlarged image of the sample at an image position from observation light generated by irradiating the excitation light on the sample;
an image capturing unit for converting the spatial intensity distribution of the enlarged image into digital image data; and
a super-resolution processing unit for generating a super-resolution image in which a super-resolution frequency component higher than a cutoff frequency of the enlarged image forming unit is made visible from at least one piece of the digital image data,
wherein the super-resolution processing unit comprises a spatial frequency intensity modulation unit that changes process contents according to (i) an intensity level of a noise included in the digital image data and (ii) an observation parameter of the super-resolution observation apparatus, and
wherein the spatial frequency intensity modulation unit (i) comprises a plurality of low-pass filters having mutually different cutoff frequencies, and (ii) cuts off, by low pass filter selected from among the plurality of low-pass filters according to the intensity level of the noise and the observation parameter, a super-resolution frequency component higher than a cutoff frequency of the selected low-pass filter included in the super-resolution image.

2. The super-resolution observation apparatus according to claim 1, wherein the low-pass filters execute a filter process for a Fourier transform of image data.

3. The super-resolution observation apparatus according to claim 1, wherein the low-pass filters execute a convolution filter process for image data.

4. The super-resolution observation apparatus according to claim 1, wherein the observation parameter is an illumination parameter of the excitation light illumination unit.

5. The super-resolution observation apparatus according to claim 1, wherein the observation parameter is a modulation parameter of the excitation light modulation unit.

6. The super-resolution observation apparatus according to claim 1, wherein the observation parameter is an image forming parameter of the enlarged image forming unit.

7. The super-resolution observation apparatus according to claim 1, wherein the observation parameter is an image capturing parameter of the image capturing unit.

8. The super-resolution observation apparatus according to claim 1, wherein the excitation light is laser light, and the noise is a laser speckle noise.

9. The super-resolution observation apparatus according to claim 1, wherein the noise is a shot noise caused by the image capturing unit.

10. The super-resolution observation apparatus according to claim 1, wherein the spatial frequency intensity modulation unit changes process contents according to a brightness value of the digital image data.

11. The super-resolution observation apparatus according to claim 1, wherein the spatial frequency intensity modulation unit changes process contents according to an exposure time of the image capturing unit.

12. The super-resolution observation apparatus according to claim 1, wherein the spatial frequency intensity modulation unit changes process contents according to an MTF of the super-resolution image.

13. The super-resolution observation apparatus according to claim 1, wherein the super-resolution processing unit generates the super-resolution image by using a plurality of pieces of the digital image data obtained in different states of the excitation light modulation unit.

14. The super-resolution observation apparatus according to claim 1, wherein the super-resolution processing unit generates the super-resolution image by using the digital image data captured while changing an intensity distribution on the sample by the excitation light modulation unit.

15. The super-resolution observation apparatus according to claim 1, wherein the spatial frequency intensity modulation unit selects, from among the plurality of low-pass filters, a low pass filter having a lower cutoff frequency as the intensity level of the noise increases.

\* \* \* \* \*